United States Patent
Echols

(10) Patent No.: US 7,065,069 B1
(45) Date of Patent: Jun. 20, 2006

(54) SYSTEM FOR INTERCONNECTING CIRCUIT-BASED TERMINAL DEVICES WITH PACKET-BASED TERMINAL DEVICES IN A VOICE COMMUNICATION CONNECTION

(75) Inventor: Troy Eric Echols, Bolingbrook, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1016 days.

(21) Appl. No.: 09/659,363

(22) Filed: Sep. 12, 2000

(51) Int. Cl.
*H04L 12/28* (2006.01)

(52) U.S. Cl. .................. 370/352; 370/357; 370/401

(58) Field of Classification Search ............ 370/352, 370/351, 353, 354, 355, 356, 401, 402, 395.52, 370/395.65, 395.54, 395.2
See application file for complete search history.

(56) References Cited

U.S. PATENT DOCUMENTS

| | | | |
|---|---|---|---|
| 5,889,774 A * | 3/1999 | Mirashrafi et al. | 370/352 |
| 6,275,574 B1 * | 8/2001 | Oran | 379/201.01 |
| 6,282,192 B1 * | 8/2001 | Murphy et al. | 370/352 |
| 6,353,660 B1 * | 3/2002 | Burger et al. | 379/88.17 |
| 6,463,053 B1 * | 10/2002 | Chen | 370/352 |
| 6,490,274 B1 * | 12/2002 | Kim | 370/352 |
| 6,674,746 B1 * | 1/2004 | Lamarque, III | 370/352 |

FOREIGN PATENT DOCUMENTS

| | | |
|---|---|---|
| WO | WO 96/38018 A1 | 11/1996 |
| WO | WO 97/16007 A1 | 5/1997 |
| WO | WO 98/24224 A1 | 6/1998 |

* cited by examiner

*Primary Examiner*—Ricky Q. Ngo
*Assistant Examiner*—Richard Chang

(57) ABSTRACT

The system for interconnecting circuit-based terminal devices with packet-based terminal devices in a voice communication connection (packet-based terminal device addressing system) provides service capabilities that allow a calling party to address packet-based terminal devices without consuming telephone numbers. In this case, the calling party, using a circuit-based terminal device such as a traditional telephone or video telephone, initiates a call to a called party, using the called party's telephone number. The packet-based terminal device addressing system presumes that the owner of the packet-based terminal device also owns a circuit-based terminal device and therefore reuses the point of presence address of the circuit-based terminal device (telephone number) for the packet-based terminal device. The packet-based terminal device addressing system employs the use of a plurality of existing systems, such as VXML, ASR, residential gateways and directory services, to locate and connect to the called party's packet-based terminal device.

15 Claims, 3 Drawing Sheets

SYSTEM FOR INTERCONNECTING CIRCUIT-BASED TERMINAL DEVICES WITH PACKET-BASED TERMINAL DEVICES IN A VOICE COMMUNICATION CONNECTION

FIELD OF THE INVENTION

This invention relates to voice communication services and, in particular, to a system that enables a calling party to initiate a voice communication connection from a circuit-based terminal device to a called party who is presently active on a packet-based terminal device at a location that differs from the called party's circuit-based terminal device point of presence.

PROBLEM

It is a problem in the field of voice communications to interconnect traditional circuit-based terminal devices with packet-based terminal devices due to the incompatible terminal device point of presence addressing methodologies used for these respective types of terminal devices. The fundamental issue facing a calling party who uses a traditional telephone terminal device is that the calling party's addressing capabilities are limited to the capabilities of both the traditional telephone terminal device and the Public Switched Telephone Network (PSTN) that serves the calling party's circuit-based terminal device. This addressing limitation constrains the calling party to addressing only circuit-based terminal devices that have telephone numbers (combinations of DTMF digits) that correspond to a point of presence on the PSTN. The called party's packet-based terminal device, such as a personal computer or other packet terminal device, that are connected to the network do not naturally have telephone numbers, rather, they are addressed using IP addresses or machine names, such as user@provider.com, that are translated to IP addresses indicative of the personal computer presence on the Internet at the present point in time.

With the advent of voice over packet technology, new types of terminal devices and new packet signaling protocols have emerged and with them new packet services. Voice over packet communications began with personal computer to personal computer communications over the Internet and there is now a lot of activity in the field of personal computer to circuit-based telephone terminal device communications. However, there is a lack of a solution to address the circuit-based telephone terminal device to personal computer communications mode. Some voice over packet communication protocols, such as H.323, support assigning E.164 addresses to packet-based voice terminal devices while others, such as SIP, do not. SIP uses a URL format for addressing that is similar to that used for Web pages and e-mail addresses. The assignment of a telephone number to a packet-based terminal device for the purpose of enabling voice service to the packet-based terminal device is a short-sighted solution since it exacerbates the exhaustion of telephone numbers problem that has been created by the proliferation of wireless telephones, fax machines and pagers. This telephone number assignment proposal has the potential to consume telephone numbers at an alarming rate.

Furthermore, there is no capability in existing circuit-based switching systems to utilize an IP address to identify a called party. The existing circuit-based switching systems can only process conventional telephone numbers and are therefore unavailable for use in connecting to the called party's packet-based terminal device or circuit-based terminal device, where the calling party only has the called party's IP address.

Thus, there is a lack of a mechanism in existing circuit-based switching systems for addressing packet-based voice terminals from circuit-based telephone terminal devices in a way that does not consume telephone numbers.

SOLUTION

The above described problems are solved and a technical advance achieved by the present system for interconnecting circuit-based terminal devices with packet-based terminal devices in a voice communication connection (packet-based terminal device addressing system) which provides service capabilities that allow a calling party to address packet-based terminal devices without consuming telephone numbers. In this case, the calling party, using a circuit-based terminal device such as a traditional telephone or video telephone, initiates a call to a called party, using the called party's telephone number. The packet-based terminal device addressing system presumes that the owner of the packet-based terminal device also owns a circuit-based terminal device and therefore reuses the point of presence address of the circuit-based terminal device (telephone number) for the packet-based terminal device. The packet-based terminal device addressing system employs the use of a plurality of existing systems, such as VXML, ASR, residential gateways and directory services, to locate and connect to the called party's packet-based terminal device.

DETAILED DESCRIPTION

Figure 1:
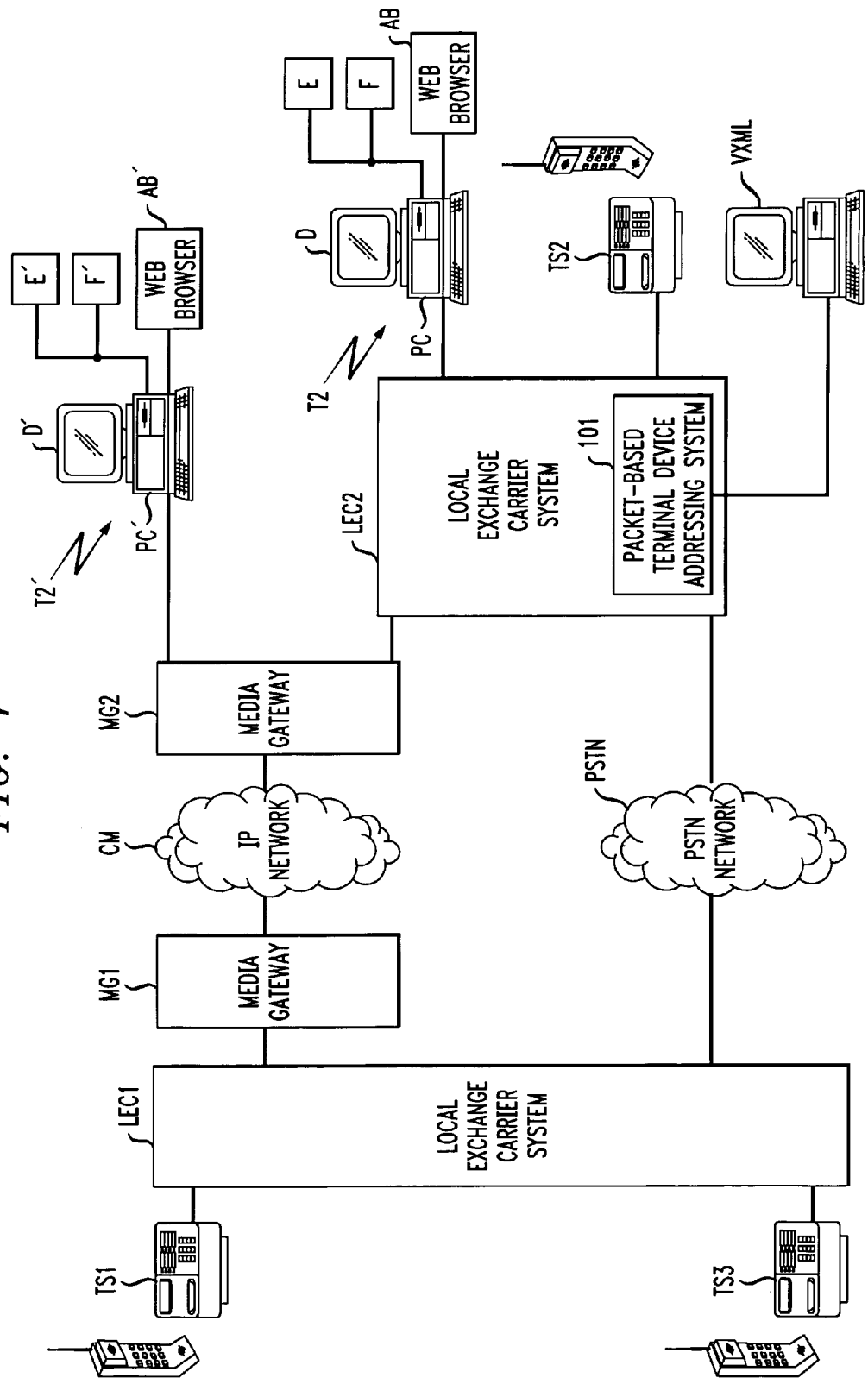
FIG. 1 illustrates in block diagram form the overall architecture of the packet-based terminal device addressing system and a typical environment in which it is operational.

FIG. 1 illustrates in block diagram form the overall architecture of the packet-based terminal device addressing system 101 and a typical environment in which it is operational. The calling party is equipped with a telephone station set TS1 and the called party is typically equipped with a packet-based terminal device, such as a personal computer, hand held computing device, cellular communication device, or other data interface device, collectively termed "terminal equipment" T2 herein. A typical terminal equipment T2 can be equipped with a processor PC, display device D, Web browser software AB, and one or more databases or data storage devices, such as database E which is used to store information retrieved from the sites served by the Internet and database F which stores programs used to operate the processor PC. The voice communication connection between the calling party's circuit-based terminal device TS1 and the called party's packet-based terminal equipment T2 can be via packet-based communication service CM (such as the Internet). The physical connection that supports this voice communication connection is typically effected from calling party's circuit-based terminal device TS1 through the Local Exchange Carrier LEC1 of the Public Telephone Switched Network (PTSN) to packet-based communication service CM via a media gateway MG1 which is also connected thereto. The packet-based communication service CM is also connected via a media gateway MG2 to a Local Exchange Carrier LEC2 which serves called party's packet-based terminal equipment T2.

There are a number of implementation possibilities in this basic communication environment. In particular, the packet-based terminal device of the called party can be connected to packet-based communication service CM via a direct connection to the media gateway MG2 from their packet-based terminal device T2' (equipped with a processor PC', display device D', Web browser software AB', and one or more databases or data storage devices E', F') via a cable link that does not use the local exchange carrier LEC2. The media gateways MG1, MG2 are shown as stand-alone devices, but can be implemented as an integral part of the local exchange carrier systems LEC1, LEC2 or packet-based communication service CM. The Public Switched Telephone Network PSTN can include various inter-exchange signaling nodes to control the switching of the call connection as is described below.

Called Party—Packet-Based Terminal Device

The fundamental issue facing a calling party who uses a traditional telephone terminal device TS1 is that the calling party's addressing capabilities are limited to the capabilities of both the traditional telephone terminal device TS1 and the Public Switched Telephone Network (PSTN) that serves the calling party's circuit-based terminal device TS1. This addressing limitation constrains the calling party to addressing only circuit-based terminal devices TS2 that have telephone numbers (combinations of DTMF digits, such as aaa-nnn-nnnn) that correspond to a point of presence on the PSTN. The called party's packet-based terminal device T2, such as a personal computer or other packet terminal device, that are connected to the network do not naturally have telephone numbers, rather, they are addressed using IP addresses or machine names, such as calledparty@provider.com, that are translated to IP addresses indicative of the personal computer presence on the Internet at the present point in time. The packet-based terminal devices can support voice over IP, but the addressing of these terminal devices using IP addresses is not served by existing circuit-based switching systems.

Figure 2A:
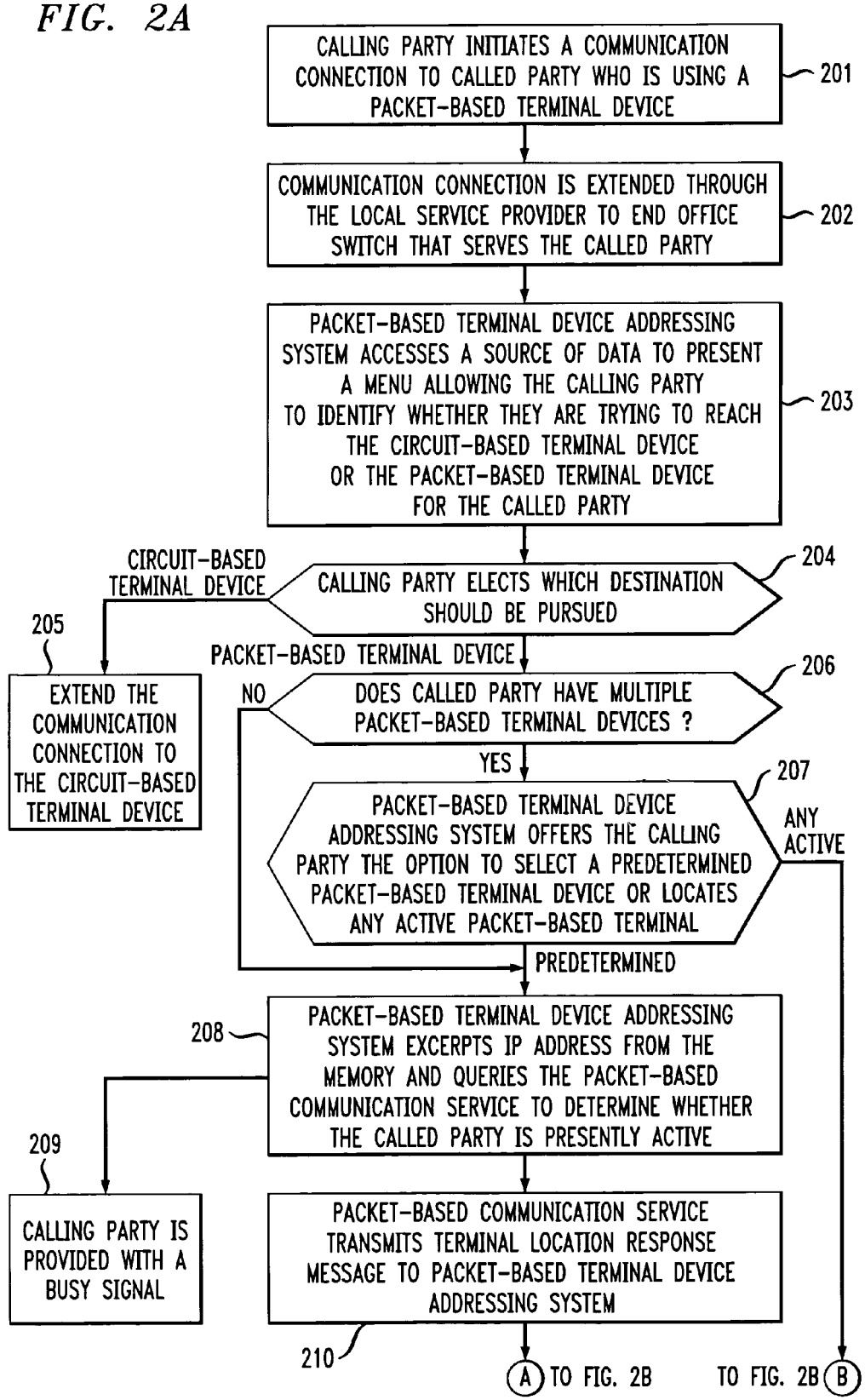
FIGS. 2A & 2B illustrate in flow diagram form the operation of the packet-based terminal device addressing system of FIG. 1 in processing a typical voice communication connection.
Figure 2B:
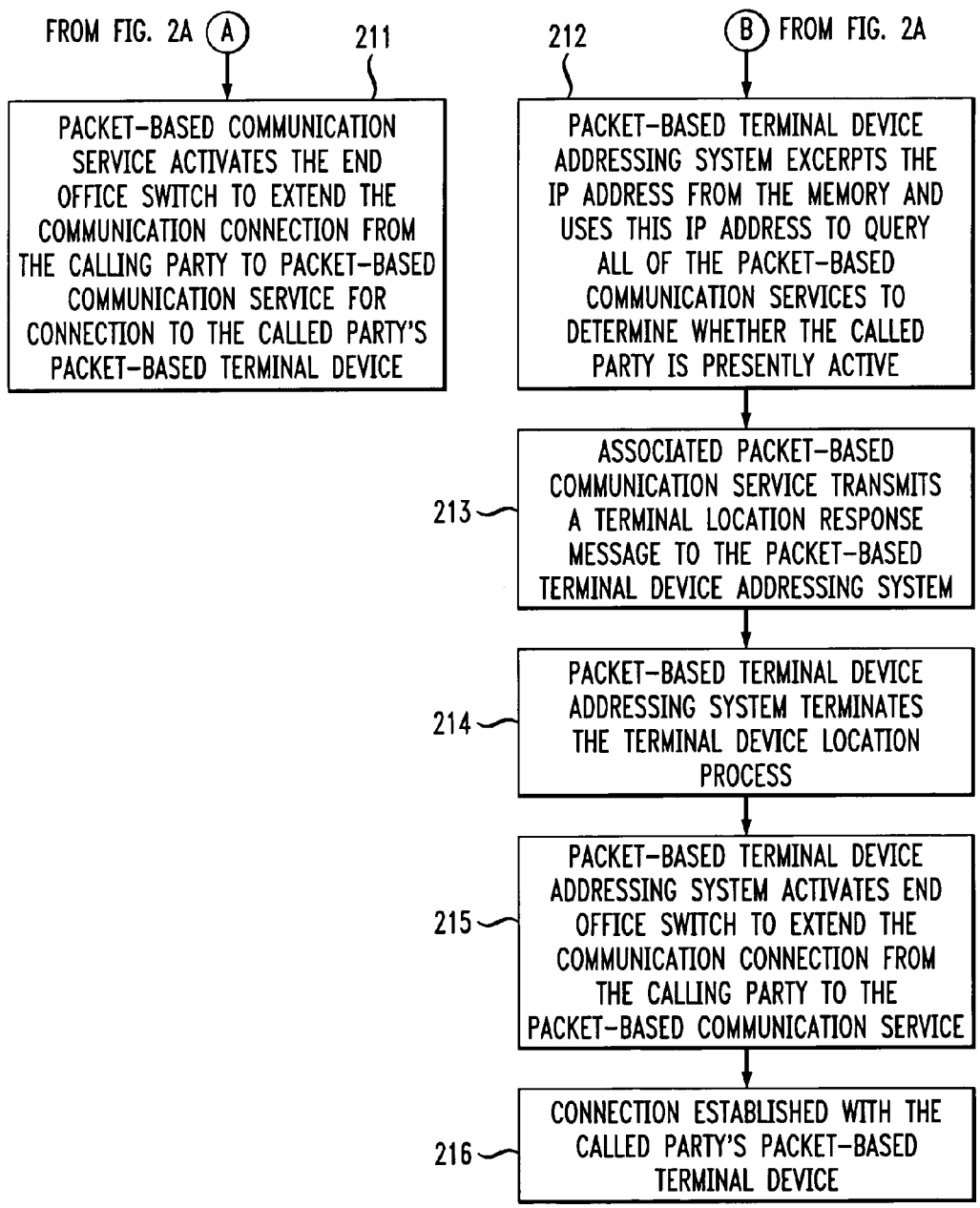

FIGS. 2A & 2B illustrate in flow diagram form the operation of the packet-based terminal device addressing system of FIG. 1 in processing a typical voice communication connection. At step 201, the calling party at a circuit-based terminal device TS1 initiates a communication connection to a called party who is using a packet-based terminal device T1 which is addressed using an IP address or machine names, such as calledparty@provider.com. The calling party dials the known telephone number (aaa-nnn-nnnn) of the circuit-based terminal TS2 owned by the called party or dials the number of an operator for assistance. The communication connection is extended at step 202 through the local service provider LEC1 to either end office switch LEC2 that serves the called party, or the operator. End office switch LEC2 receives the incoming call from the calling party and can either extend the call connection to the circuit-based terminal device TS2 of the called party or a packet-based terminal T2 of the called party. Therefore, at step 203, the packet-based terminal device addressing system 101 accesses a source of data, such as VXML server to present a menu (or the operator provides the calling party with a selection of choices) allowing the calling party to identify whether they are trying to reach the circuit-based terminal device TS2 or the packet-based terminal device T2 for the called party or other terminal devices, such as a cellular telephone, voice mail, e-mail, and the like. Alternatively, the packet-based terminal device addressing system 101 can automatically route the incoming call to a destination previously selected as the default by the called party.

At step 204, the calling party elects which destination should be pursued. If the calling party elects to extend the communication connection to the circuit-based terminal device TS2 of the called party, then processing of the communication connection proceeds at step 205 in well known fashion to connect to the extend the communication connection to the circuit-based terminal device TS2 of the called party via the end office switch LEC2. If the calling party elects to extend the communication connection to a packet-based terminal device T2 of the called party at step 204, then the packet-based terminal device addressing system 101 uses VXML server to perform a directory lookup to determine the appropriate non-circuit-based telephone number address for packet-based terminal device T2. If the called party has multiple packet-based terminal devices T2, T2' and the like as determined at step 206, then the packet-based terminal device addressing system 101 can offer the calling party at step 207 the option to select among these packet-based terminal devices or to simply attempt to locate one of these packet-based terminal devices that is presently active. If the calling party selects one of these packet-based terminal devices such as T2, or the called party is equipped with only one packet-based terminal device T2, then at step 208, the packet-based terminal device addressing system 101 excerpts the IP address or machine name, such as calledparty@provider.com, from the memory and uses this IP address to initiate a packet-based call through media gateway MG2 over packet-based communication service CM, to the called party. If the called party cannot be contacted, the calling party is provided with a busy indication at step 209. If the called party is presently active on their packet-based terminal device T2, then the packet-based communication service CM transmits a terminal location response message to the packet-based terminal device addressing system 101 at step 210, which activates the end office switch LEC2 to extend the communication connection from the calling party to the packet-based communication service CM via media gateway MG2 for connection to the called party's packet-based terminal device T2 at step 211. The calling party and called party are thereby interconnected and communicate.

The interconnection of the calling party and the called party can be implemented via the inter-exchange signaling capability of the PSTN, where the local exchange carrier LEC1 serving the calling party at circuit-based terminal device TS1 connects circuit-based terminal device TS1 to packet-based communication service CM via media gateway MG1 and the local exchange carrier LEC2 serving the called party at packet-based terminal device T2 connects packet-based terminal device T2 to packet-based communication service CM via dial-up internet connection. Alternatively, media gateway MG2 can be used to interconnect the called party at packet-based terminal device T2 with the incoming call received by local exchange carrier LEC2.

If at step 207, the calling party simply attempts to locate one of these packet-based terminal devices that is presently active, then at step 212 the packet-based terminal device addressing system 101 excerpts the IP address or machine name, such as calledparty@provider.com, from the memory and uses this IP address to initiate a packet-based call through media gateway MG2 over packet-based communication service CM, to the called party. If the called party cannot be contacted, the calling party is provided with a busy indication at step 209. If the called party is presently active on their packet-based terminal device T2, then the associated packet-based communication service CM transmits a terminal location response message to the packet-based terminal device addressing system 101 at step 213, which terminates the terminal device location process at step 214. At step 215, the packet-based terminal device addressing system 101 activates the end office switch LEC2 to extend the communication connection from the calling party to the packet-based communication service CM via media gateway MG2 for connection to the called party's packet-based terminal device T2 at step 216. The calling party and called party are thereby interconnected and communicate.

SUMMARY

The packet-based terminal device addressing system allows circuit-based terminal devices such as traditional telephones and video telephones to address packet-based terminal devices without consuming telephone numbers. The packet-based terminal device addressing system presumes that the owner of the packet-based terminal device also owns a circuit-based terminal device and therefore reuses the point of presence address of the circuit-based terminal device for the packet-based terminal device.

What is claimed:

1. A packet based terminal device addressing system for enabling a calling party using a circuit based terminal device, which is addressable via a telephone number, to initiate a communication connection to a called pay who is using a packet-based terminal device, which is addressable via an IP address, comprising:
    means for storing data in a memory indicative of a correspondence between at least one IP address assigned to a called part/s pair-based terminal device and a telephone number assigned to said called party's circuit-based terminal device;
    means, responsive to a calling party, connected to the Public Telephone Switched Network via a Local Exchange Carrier serving said calling parry, dialing the telephone number assigned to said circuit-based terminal device of said called party, for transmitting said telephone number to a Local Exchange Carrier serving said called party;
    means, responsive to receipt of data from said calling party by said Local Exchange Carrier serving said called party and indicative of said called party's telephone number corresponding to said called party's circuit-based terminal device, for retrieving data from said memory indicative of said IP address assigned to a called party's packet-based terminal device, comprising:
    means for providing said calling party with a list of said called party's circuit-based terminal devices and said called party's packer-based terminal devices,
    means, responsive to said calling party select one of said called party's circuit-based terminal devices and said called party's packet-based teal devices, for identifying a communication service serving said selected one of said called party's circuit-based terminal devices and said called party's packet-based terminal devices; and
    means for extending a communication connection that exists from said calling party's circuit-based terminal device to said Local Exchange Carrier serving said called party, to said called party's packet-based terminal device.

2. The packet based terminal device addressing system of claim 1 wherein said means for extending comprises:
    means for transmitting said IP address assigned to said called party's packet-based terminal device to at least one packet-based communication service to locate said called party's packet-based terminal device.

3. The packet based terminal device addressing system of claim 2 wherein said means for extending further comprises:
    means, responsive to receipt of a message from one of said at least one packet-based communication services indicative of a presence of said called party's packet-based terminal device on said one of said at least one packet-based communication services, for extending a communication connection from said calling party's circuit-based terminal device to said one of said at least one packet-based communication services.

4. The packet based terminal device addressing system of claim 1 wherein said means for storing comprises:
    means for storing a set of data comprising data indicative of an IP address assigned to each of a plurality of a called party's packet-based terminal devices.

5. The packet based terminal device addressing system of claim 4 wherein said means for retrieving comprises:
    means for providing said calling party with a list of said called party's packet-based terminal devices; and
    means, responsive to said calling par selecting a one of said called party's packet-based terminal devices, for identifying a packet-based communication service serving said called party's packet-based terminal device.

6. A method of operating a packet based terminal device addressing system for enabling a calling party using a circuit based terminal device, which is addressable via a telephone number, to initiate a communication connection to a called party who is using a packet-based terminal device, which is addressable via an IP address, comprising the steps of:
    storing data in a memory indicative of a correspondence between at least one IP address assigned to a called party's packet-based term device and a telephone number assigned to said called party's circuit-based terminal device;
    transmitting, in response to a calling party, connected to the Public Telephone Switched Network via a Local Exchange Carrier serving said calling party, dialing the telephone number assigned to said circuit-based terminal device of said called party, said telephone number to a Local Exchange Carrier serving said called party;
    retrieving, in response to receipt of data from said calling party by said Local Exchange Carrier serving said called party and indicative of said called party's telephone number corresponding to said called party's circuit-based terminal device, data from said memory indicative of said IP address assigned to a called party's packet-based terminal device, comprising:
    providing said calling party with a list of said called party's circuit-based terminal devices and said called party's packet-based terminal devices,
    identifying, in response to said calling party selecting one of said called party's circuit-based terminal devices and said called party's packet-based terminal devices, a communication service serving said selected one of said called party's circuit-based terminal devices and said called party's packet-based terminal devices; and extending a communication connection that exists from said calling party's circuit-based terminal device to said Local Exchange Carrier serving said called party, to said called party's packet-based terminal device.

7. The method of operating a pack based terminal device addressing system of claim 6 wherein said step of extending comprises:
   transmitting said IP address assigned to said called party's packet-based terminal device to at least one packet-based communication service to locate said called party's packet-based terminal device.

8. The method of operating a packet based terminal device addressing system of claim 7 wherein said step of extending further comprises:
   extending, in response to receipt of a message from one of said at least one packer-based communication services indicative of a presence of said called party's packet-based terminal device on said one of said at least one packet-based communication services, a communication connection from said calling party's circuit-based terminal device to said one of said at least one packet-based communication services.

9. The method of operating a packet based terminal device addressing system of claim 6 wherein said step of storing in a memory comprises:
   storing a set of data comprising data indicative of an IP address assigned to each of a plurality of a called party's packet-based terminal devices.

10. The method of operating a packet based terminal device addressing system of claim 9 wherein said step of retrieving comprises:
    providing said calling party with a list of said called party's packet-based terminal devices; and
    identifying, in response to said calling party selecting a one of said called party's packet-based terminal devices, a packet-based communication service serving said called party's packet-based terminal device.

11. A packet based terminal device addressing system for enabling a calling party using a circuit based terminal device, which is addressable via a telephone number, to initiate a communication connection to a called party who is using a packet-based terminal device, which is addressable via an IP address, comprising:
    data storage means for storing data in a memory indicative of a correspondence between at least one IP address assigned to a called party's packet-based terminal device and a telephone number assigned to said called party's circuit-based terminal device;
    call origination means, responsive to a calling party, connected to the Public Telephone Switched Network via a Local Exchange Carrier serving said calling party, dialing the telephone number assigned to said circuit-based terminal device of said called party, for transmitting said telephone number to a Local Exchange Carrier serving said called party;
    terminal device location means, responsive to receipt of data from said calling party by said Local Exchange Carrier serving said called party and indicative of said called party's telephone number corresponding to said called party's circuit-based terminal device, for retrieving data from said memory indicative of said IP address assigned to a called party's pa-based terminal device, comprising:
    destination selection means for providing said calling parry with a list of said called party's circuit-based terminal devices and said called party's packet-based terminal devices,
    call routing means, responsive to said calling party selecting one of said called party's circuit-based terminal devices and said called party's packet-based terminal devices, for identifying a communication service serving said selected one of said called party's circuit-based terminal devices and said called party's packet-based terminal devices; and
    communication connection means for extending a communication connection that exists from said calling party's circuit-based terminal device to said Local Exchange Carrier serving said called party, to said called party's packet-based terminal device.

12. The packet based terminal device addressing system of claim 11 wherein said communication connection means comprises:
    terminal device locator means for transmitting said IP address assigned to said called party's packet-based terminal device to at least one packet-based communication service to locate said called party's packet-based terminal device.

13. The packet based terminal device addressing system of claim 12 wherein said communication connection means further comprises:
    inquiry response means, responsive to receipt of a message from one of said at least one packet-based communication services indicative of a presence of said called party's packet-based terminal device on said one of said at least one packet-based communication services, for extending a communication connection from said calling party's circuit-based terminal device to said one of said at least one packet-based communication services.

14. The packet based terminal device addressing system of claim 11 wherein said data storage means comprises:
    directory means for storing a set of data comprising data indicative of an IP address assigned to each of a plurality of a called party's packet-based terminal devices.

15. The packet based terminal device addressing system of claim 14 wherein said terminal device location means comprises:
    destination selection means for providing said calling party with a list of said called party's packet-based terminal devices; and
    service identification means, responsive to said calling party selecting a one of said called party's packet-based terminal devices, for identifying a packet-based communication service serving said called party's packet-based terminal device.

* * * * *